(12) United States Patent
Burke (10) Patent No.: US 8,794,692 B1
(45) Date of Patent: Aug. 5, 2014

(54) GULL WING DOOR ASSEMBLY FOR ALL-TERRAIN VEHICLES

(76) Inventor: Christopher Marshall Burke, Eden, UT (US)

( * ) Notice: Subject to any disclaimer, the term of this patent is extended or adjusted under 35 U.S.C. 154(b) by 0 days.

(21) Appl. No.: 13/559,260

(22) Filed: Jul. 26, 2012

Related U.S. Application Data (60) Provisional application No. 61/512,185, filed on Jul. 27, 2011.

(51) Int. Cl.
*B60J 5/04* (2006.01)
*B60R 21/13* (2006.01)

(52) U.S. Cl.
USPC .......... 296/146.11; 296/205; 280/756; 49/36; 49/40

(58) Field of Classification Search
USPC ............. 296/146.11, 205; 49/40, 36; 280/756
See application file for complete search history.

(56) References Cited

U.S. PATENT DOCUMENTS

| | | | | |
|---|---|---|---|---|
| 4,070,056 A | * | 1/1978 | Hickman | ............ 296/148 |
| 4,299,058 A | * | 11/1981 | Spaulding | ............ 49/386 |
| 6,676,193 B1 | | 1/2004 | Hanagan | |
| 7,007,346 B2 | | 3/2006 | Hoffman | |
| 7,281,753 B2 | | 10/2007 | Curtis, Jr. et al. | |
| 8,056,183 B2 | * | 11/2011 | Shoemaker et al. | ............ 16/58 |
| D659,062 S | | 5/2012 | Danze | |
| 2007/0164066 A1 | * | 7/2007 | Jones | ............ 224/328 |
| 2007/0283535 A1 | * | 12/2007 | Hoffman | ............ 16/366 |
| 2012/0032431 A1 | | 2/2012 | King | |
| 2012/0217078 A1 | * | 8/2012 | Kinsman et al. | ............ 180/69.4 |

FOREIGN PATENT DOCUMENTS

| | | |
|---|---|---|
| CN | 201457578 U | 5/2010 |
| CN | 201769657 U | 3/2011 |
| CN | 201771327 U | 3/2011 |
| EP | 1334856 B1 | 12/2009 |
| JP | 2011-501712 | 1/2011 |

\* cited by examiner

*Primary Examiner* — Dennis H Pedder
(74) *Attorney, Agent, or Firm* — David W. Barman (57) ABSTRACT

A gull wing door assembly for an all-terrain utility vehicle (UTV) includes a hinge assembly configured to attach to an upper portion of the cage of the UTV, the hinge assembly having a rotational axis substantially parallel to the ground when attached to the cage, and a door configured to movably attach to the hinge assembly. The door may have a frame, one or more panels, a latch, and a lift-assist device such as a gas-strut.

8 Claims, 6 Drawing Sheets

GULL WING DOOR ASSEMBLY FOR ALL-TERRAIN VEHICLES

RELATED APPLICATIONS

The present application claims the benefit of U.S. Provisional Patent Application No. 61/512,185, filed Jul. 27, 2011, which is incorporated herein by reference in its entirety.

THE FIELD OF THE INVENTION

The present invention relates to doors for all-terrain vehicles. More specifically, the present invention relates to a gull wing door assembly for all-terrain utility vehicles.

BACKGROUND

Side-by-side all-terrain utility vehicles (UTVs) are increasing in popularity for their versatility. UTVs are used for many recreational and work purposes, such as trail riding, racing, cargo hauling, and transportation. In addition, UTVs have side-by-side passenger seating on a front bench seat for two or more passengers, and in some models they include additional rows of side-by-side seating for two or more passengers behind the front bench. The UTV generally has an open cage built around a cab for protecting the passengers in the UTV and providing strength and maintaining structural integrity to the UTV in the event the UTV rolls or crashes. However, the open cage leaves passengers exposed to other objects that may be encountered while traveling in a UTV.

Others have employed standard doors that open along a hinge having a vertical rotational axis have been employed in UTVs, such as in U.S. Pat. No. 7,281,753, but such doors have a limited range of motion, and the door frames and hinges can make entering and exiting a UTV difficult and cumbersome. They are not easy to open and close, often do not stay shut, and do not stay aligned. In addition, the standard doors may be difficult to open in different environments where obstructions in the path of travel of the UTV obstruct the range of motion of the doors. Furthermore, many UTVs do not have a cage or frame that is conducive to attaching a standard door having a hinge with a vertical rotational axis.

SUMMARY OF THE INVENTION

It is an object of the present invention to further enhance the versatility, comfort, and safety features of UTVs by providing a gull wing door assembly.

According to one aspect of the present invention, a gull wing door assembly for an all-terrain utility vehicle may include a hinge assembly configured to attach to an upper portion of the cage of the UTV, the hinge assembly having a rotational axis substantially parallel to the ground when attached to the cage, and a door configured to movably attach to the hinge assembly. The door may have a frame, one or more panels, a latch, and also may include a lift-assist device such as a gas-strut.

According to another aspect of the present invention, the door may have a frame, one or more panels, a latch, and also may include a lift-assist device such as a gas-strut.

These and other aspects of the present invention are realized in a gull wing door assembly as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
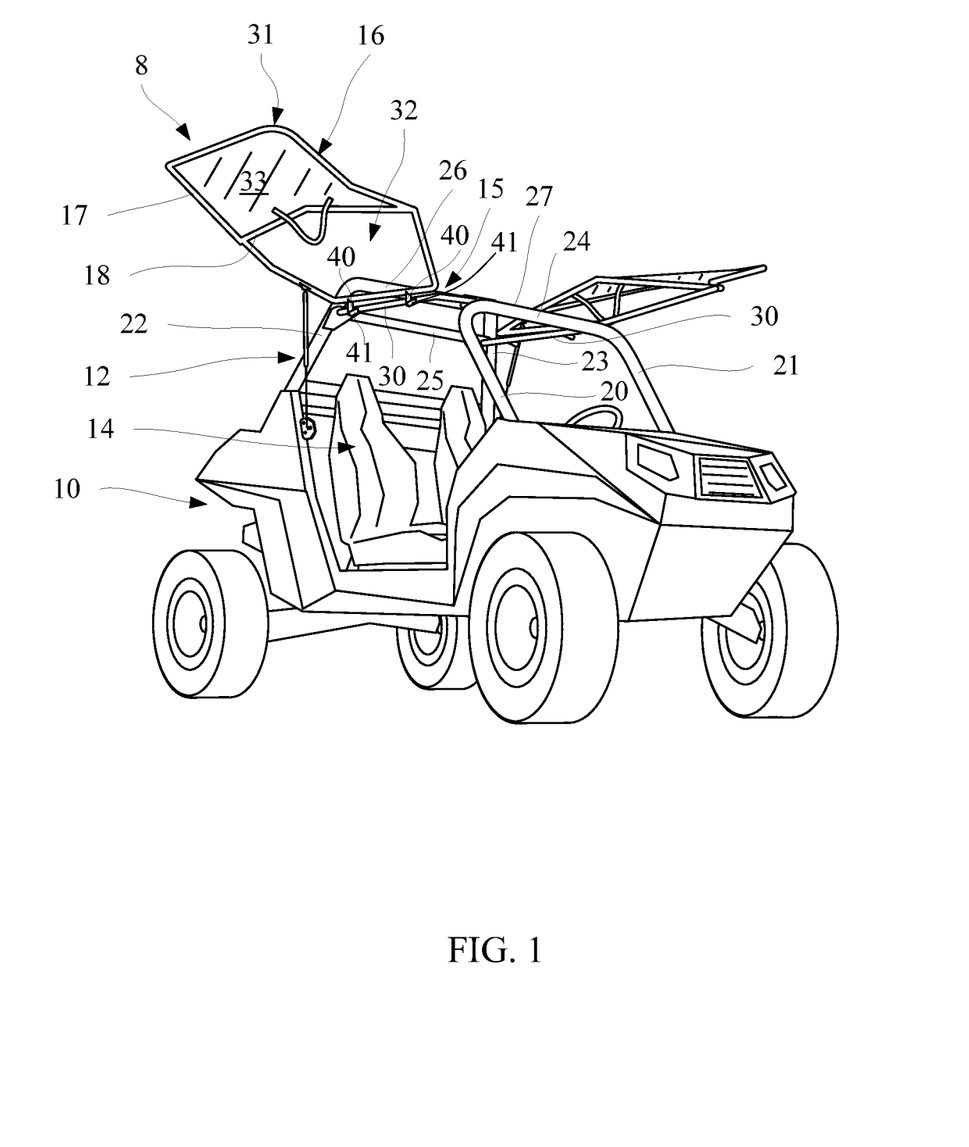
FIG. 1 shows a perspective view of a UTV with a gull wing door assembly according to principles of the present invention, with the doors in the open position.
Figure 2:
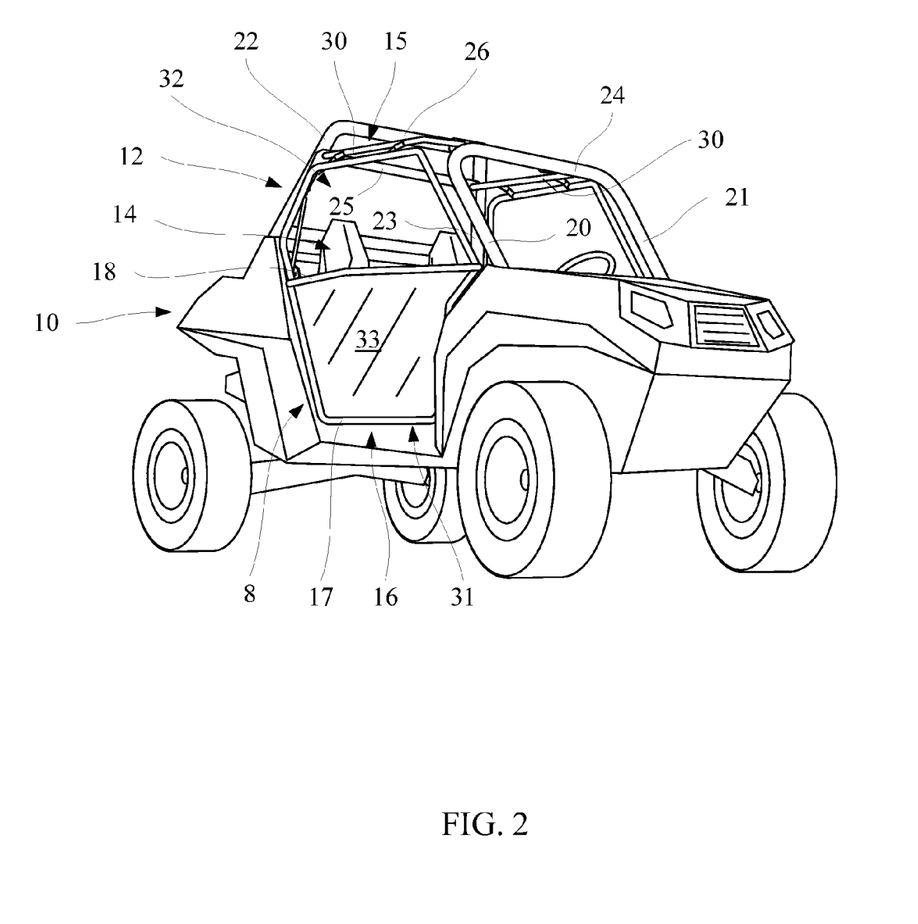
FIG. 2 shows a perspective view of a UTV with a gull wing door assembly according to principles of the present invention, with the doors in the closed position.

Referring now to FIGS. 1 and 2, there is shown a gull wing door assembly 8 as implemented on a two-seat all-terrain side-by-side utility vehicle (UTV) 10. The UTV 10 has a cage 12 about the passenger seating area creating a cab 14. The cage 12 provides protection to the UTV passengers in the cab 14 in case the UTV 10 rolls or crashes. The cage 12 is generally made of a strong, durable material, such as a metal, steel, or a composite. The cage 12 is generally designed and built so that passengers in the cab 14 remain inside the cage 12 when riding in the UTV 10, including the passengers' head, arms, and legs. The cage 12 generally includes a left front post 20, right front post 21, left rear post 22, and right rear post 23. Attached to the left and right front and rear posts are a front crossbar 24, rear crossbar 25, left crossbar 26, and right crossbar 27 (not visible). The crossbars and posts may have other strengthening members attached (not shown) to provide strength and durability to the cage 12, often at joints of the crossbars.

The gull wing door assembly 8 of the present invention may include a door 16 attached to a hinge assembly 15 which may be removably attached to the cage 12. The door 16 may include a frame 17, generally made of a strong, durable material, such as a metal, steel, or a composite. The frame 17 may be made of tubular or rectangular components, or of any other form or shape. The frame 17 may be any shape, but in one aspect the frame 17 is designed to fully close the side of the cab 14 when the door 16 is closed (FIG. 2). This may be done by providing the shape of the frame 17 to correspond to the shape of the side opening of the cab 14. It may alternatively be done by providing the shape of the frame 17 to overlap the side of the cab 14.

The door frame 17 may also include a cross-member 18. Cross-member 18 serves to define a lower portion 31 within the frame and an upper portion 32 within the frame. The cross-member 18 is generally made of the same material as the frame 17. The cross-member 18 provides strength, durability, and rigidity to the door 16. In addition, the cross-member 18 may be used to attach a protective panel 33 to the lower portion, upper portion, or both. For example, as shown in FIGS. 1 and 2, the lower portion 31 comprises a panel 33 attached to the frame 17 and cross-member 18. The panel 33 can be any type of material, such as but not limited to fabric, canvas, leather, vinyl, mesh screen, netting, metal, tin, aluminum, fiberglass, and the like. The panel 33 can be used to provide protection from mud, sticks, rocks, and other objects that a passenger may be subjected to during travel on the UTV 10. Use of a mesh or clear material may also provide protection from bugs and adverse weather conditions such as snow, rain, hail, sleet, sun, and cold, particularly if the material is used on the upper portion 32 and around the other open portions of the cage 12. In another embodiment, the upper portion 32 may also include a panel (not shown). In one aspect of the gull wing door assembly 8, the cross-member 18 may also bulge outwards away from the cab 14, thus providing extra room for passengers when riding in the UTV 10. The bulge may comprise a bend or curve in the cross-member 18. The location of the cross-member 18 can generally be at any position on the frame 17, but preferably it is located below the head of a passenger when riding in the UTV 10, thus allowing the passenger to see outside the UTV 10 while also providing protection to the passenger. In another embodiment, the cross-member 18 is located so as to provide an armrest for the passenger.

Figure 3:
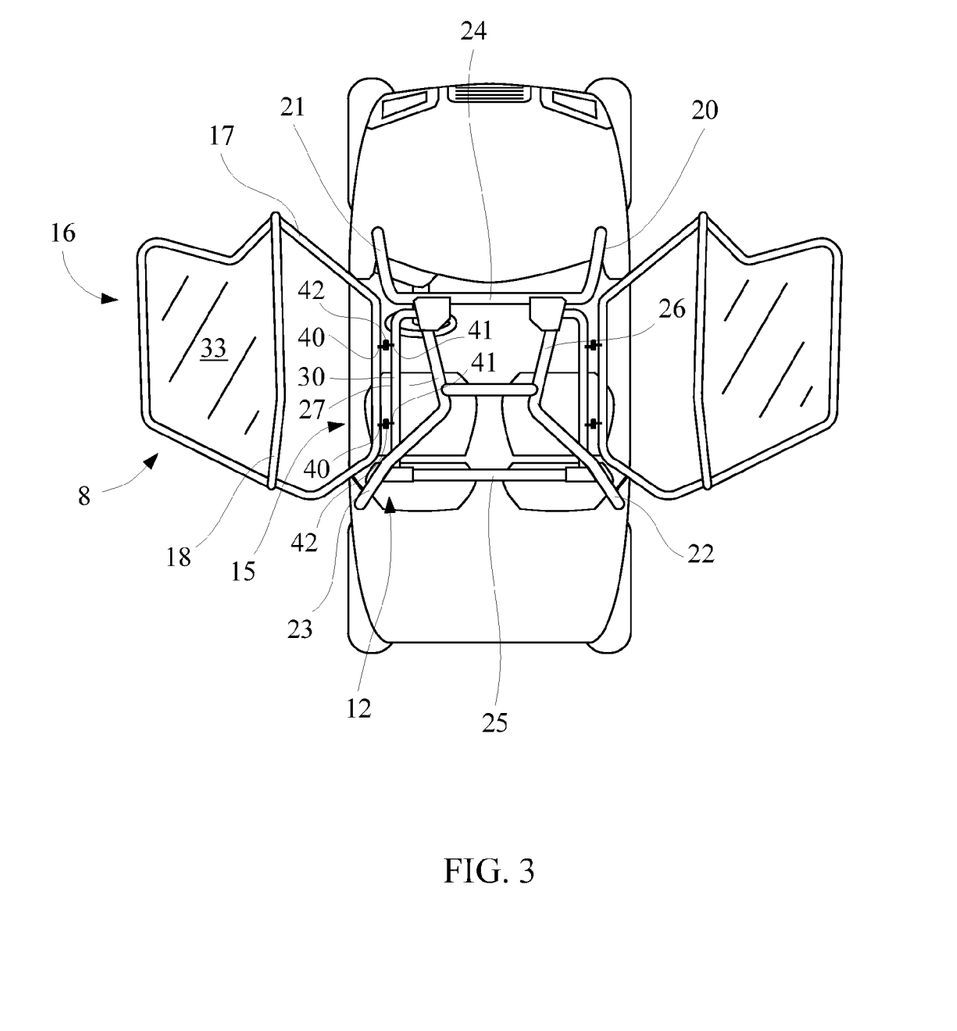
FIG. 3 shows a plan view of a gull wing door assembly, with the doors in the open position.

The door 16 is attached to a hinge assembly 15 which is attached to an upper portion of the cage 12. In one aspect, as shown in FIG. 3, the hinge assembly 15 comprises an upper door brace 30 having one or more upper door brace hinge brackets 41 attached thereto. The frame 17 has a corresponding number of door hinge brackets 40. In the embodiment shown in the Figures, the door hinge bracket 40 (FIGS. 4 & 5: 140) may be a flat bracket extending from the frame 17, generally perpendicular to the frame 17. Each door hinge bracket 40 may be configured to movably attach to an upper door brace hinge bracket 41 (FIGS. 4 & 5: 141), which is attached to the upper door brace 30. An upper door brace hinge bracket 41 may include a flat bracket extending outward from the upper door brace 30, generally perpendicular to the upper door brace 30. Both the door hinge bracket 40 and upper door brace hinge bracket 41 may have a hole for receiving a hinge pin (FIG. 4: 142), such as a bolt, pin, or other cylindrical object or axle around which the door 16 can rotate when attached to the upper door brace 30. If the hinge pin is a bolt, it may also include a nut and washers for securing the hinge pin to the hinge assembly 15.

The door hinge brackets 40 and upper door brace hinge brackets 41 are generally aligned to be in contact, or close to contact, with one another when the door 16 is installed on the UTV. A tight fit is not necessary and may impede easy movement, but may be used with a lubricant. The hinge assembly 15 is configured so as to have a rotational axis substantially parallel to the ground when the hinge assembly 15 is attached to the cage 12 (see, e.g. FIGS. 1 and 2). Substantially parallel as used herein generally means that when the door opens, it opens upward (FIG. 1). In one aspect, the rotational axis is located within the plane of the top of the cage 12 as defined by the cage crossbars. In another aspect, the angle between the rotational axis and the ground may be 45° or less, and more preferably 30° or less, and most preferably 20° or less.

The upper door brace 30 is secured to an upper portion of the cage 12 to provide a hinge assembly 15 by which the door 16 can be movably attached to the UTV. The upper door brace 30 is generally secured to one or more top crossbars and/or posts of the cage 12. The upper door brace 30 can be secured to the cage 12 in any manner known to those of skill in the art, such as by welding, by fastening with bolts, snap-fitting, or by the use of mounting plates and mounting clamps, as shown in the figures.

Figure 4:
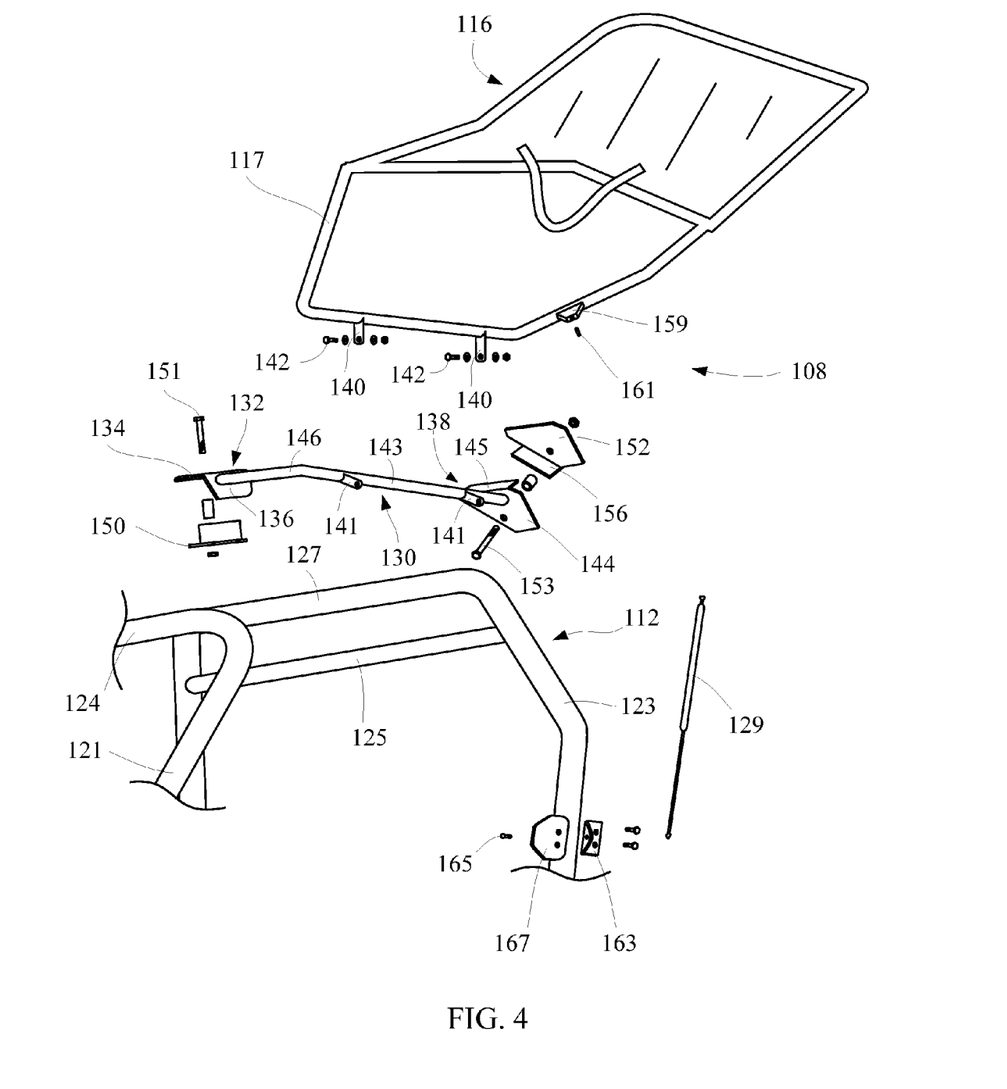
FIG. 4 shows an exploded view of a portion of the gull wing door assembly.
Figure 5:
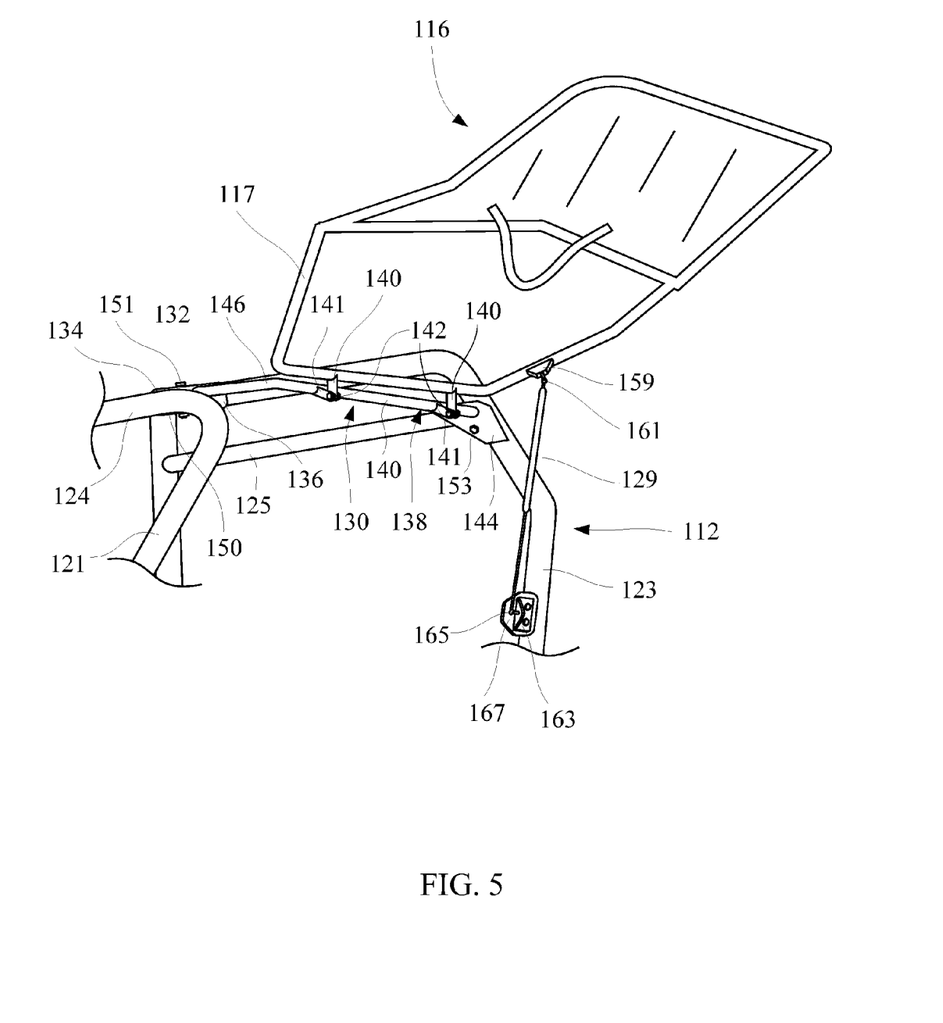
FIG. 5 shows a perspective view of the assembled gull wing door assembly of FIG. 4.

FIGS. 4-5 show one exemplary embodiment for securing the gull wing door assembly and upper door brace to the cage of a POLARIS® RZR® UTV, but the principles described herein may be adapted for use on any type or model of UTV. The upper door brace 130 may have a front end 132 secured to both the left crossbar 127 and front crossbar 124 at their joint, and rear end 138 secured to the left rear post 123 and rear crossbar 125 at their joint. The front end 132 may have a top mounting plate 134 configured to rest on the left crossbar 127 and front crossbar 124 at the joint, and a side flange 136 attached to the top mounting plate 134 along the top edge of the side mounting plate 136 and configured to butt against the side of left crossbar 127. The rear end 138 has a rear mounting plate 144 configured to butt against the left rear post 123 and rear crossbar 125 at the joint, and a top flange 145 configured to rest on the rear crossbar 125 without interfering with the left rear post 123. The brace member 143 may be connected to the side flange 136 of the front end 132 and the rear mounting plate 144 of the rear end 138, and may be connected to these by any means known to those of skill in the art, including welding or fastening with fasteners. The brace member 140 may also include a bend 146 as necessary to ensure that the plane created by the door frame 117 remains in the plane of the side of the UTV cab, thus allowing the door 116 when attached to close relatively flush or tight against the side of the UTV. This is particularly needed when the joints between the top crossbars and/or posts are disposed outside the plane of the UTV side or cab, as is shown in FIG. 3.

Referring again to FIGS. 4 and 5, a bottom clamping plate 150 may have a flat surface and may be configured to fit against the underside of the joint of the right crossbar 127 and front crossbar 124, and optionally has a flange 154 projecting upward to butt against any joint support members (see FIG. 4, 135). The top mounting plate 134 and bottom clamping plate 150 may then be secured to one another, such as by a fastener, bolt, snap-assembly, or welding. As shown in the Figures, a bolt 151 is inserted through a hole in both the top mounting plate 134 and the bottom clamping plate 150 to secure them together around the front crossbar 124 and left crossbar 127. In like manner, a rear clamping plate 152 is configured to fit behind the rear crossbar 125, rear post 123, and rear mounting plate 144, and optionally has a flange 156 configured to butt against, or overhang, the rear crossbar 125 or left rear post 123, thus further securing the rear clamping plate 152 to the cage 12. The rear clamping plate 152 is configured to be attached to the rear mounting plate 144, such as by fastener, bolt, snap-assembly, or welding. As shown in the Figures, a bolt 153 is inserted through a hole in both the rear mounting plate 144 and the rear clamping plate 152 to secure them together around the rear crossbar 125 and left rear post 123. The top mounting plate 134, bottom clamping plate 150, rear mounting plate 144, and rear clamping plate 152 may optionally have bent or flanged edges configured to fit or rest against any one or more of the crossbars and posts, thereby further securing the upper door brace 130 to the cage 112 and providing greater strength and rigidity to the gull wing door assembly.

The upper door brace 130 shown in FIGS. 4 and 5 is exemplary of an upper door brace configured for use on a POLARIS® RZR® UTV. However, it should be understood that the principles of the invention may be applied to any UTV having any type of cage configuration. Accordingly, the specific shape and configuration of the upper door brace 130 may vary depending on the type of UTV or vehicle on which the gull wing door assembly is installed. In addition, it is not necessary to attach the upper door 130 brace to the cage 112 at the joints of crossbars and posts, although that arrangement is known to provide strength, durability, and rigidity to the gull wing door assembly. It should be appreciated that the upper door brace 130 can be attached to the cage 112 at locations other than joints, such as only on crossbars or posts, and that the upper door brace 130 can be attached with the use of fasteners, bolts, pins, or welding. In general, the upper door brace 130 of the gull wing door assembly is attached to the cage 112 at a point sufficiently high so as to allow room underneath for a passenger to enter and exit the cab 114 without impediment.

It should also be understood that any type of hinge assembly may be utilized to movably attach the gull wing doors to the UTV cage. The Figures show exemplary embodiments of a hinge assembly as used on a POLARIS® RZR® UTV, but it should be appreciated that any type of hinge that allows the gull wing doors to movably rotate about a linear axis along the side of the top of the cage may be implemented. The hinge assembly as shown and described herein is therefore not intended to limit the scope of hinge assemblies recited by the claims.

The gull wing door assembly may also include a lift-assist device for facilitating opening the gull wing door and/or leaving the gull wing door open without the need for a person to hold it open. For example, in one embodiment shown in FIGS. 4 and 5, the gull wing door assembly 108 includes a gas strut 129 attached to the door frame 117 and left rear post 123. A frame strut bracket 159 is attached to the frame 117 for securing a ball mount 161. The left rear post 123 has a post strut bracket 163 attached for securing a ball mount 165. The post strut bracket 163 can be attached anywhere on the rear post, but in one aspect it is attached to the mounting bracket 167 provided by the UTV manufacturer for the door bar (not shown). Nevertheless, it can be attached at any location on the rear post 123 through the use of fasteners, bolts, or welding. The position of the brackets 159 and 163 on the frame 117 and rear post 123 should be selected to provide sufficient support when the door 116 is open, such as by providing a sufficient angle between the gas strut 129 and the rear post 123 (see FIG. 5). A first end of the gas-strut 129 is attached to ball mount 165, and a second end of the gas strut 129 is attached to ball mount 161. The gas strut 129 connection to the ball mounts 161 and 165 allows the gas strut 129 to rotatably move about the ball mounts 161 and 165 in a non-planar direction as the door 116 opens. However, the door assembly 108 can be configured so that the gas strut 1129 moves in only one plane when the door 116 opens, thus allowing a uni-directional hinged connection between the gas strut 129 and the brackets 159 and 163. It should also be appreciated that the gas strut 129 can be implemented on the front post 121 and front of the door frame 117, and on UTVs with multiple bench seats it can be implemented on any of the cage posts. The gas strut provides assistance to lift and open the door, and further allows the door to remain open, thereby providing easier entrance and exiting from the UTV. The gas strut also allows the door to remain open high enough that a passenger can stand under the door without crouching or bending over and without hitting his or her head on the door. It should also be appreciated that any type lift device other than a gas strut can be used, such as a gas spring, compression spring, and the like.

Referring again to FIGS. 1 and 2, to maintain the door 16 securely closed when desired, the gull wing door assembly 8 further comprises a latch assembly (not shown). The latch assembly may be any type of latch known to those of skill in the art, such as a bear claw latch. Generally, the latch assembly comprises a door striker attached to a striker mounting plate attached to the UTV 10, a latch attached to the door frame 17, and a door handle attached to the latch on the door frame 17. The striker mounting plate can be attached at any location on the UTV 10, but is preferably attached at a location corresponding to the bottom of the frame 17, such as the floor of the UTV 10. This minimizes rattle and movement of the door 16 during use of UTV 10 because the door 16 is latched shut on the bottom and attached at the top by the hinge assembly 15. However, any location on the UTV 10 can be used to secure to the striker mounting plate. In one aspect, the striker mounting plate can be attached to existing holes or locations on the UTV frame, such as a door bar bracket pre-installed by the UTV manufacturer. In another aspect, the striker mounting plate can be attached anywhere on the UTV frame by the use of fasteners, bolts, or welding. The latch is attached to the door frame at a corresponding location such that the latch aligns with the door striker. In another aspect, the door may also have a pull-strap attached to assist the passenger in pulling the door closed when seated in the UTV.

Figure 6:
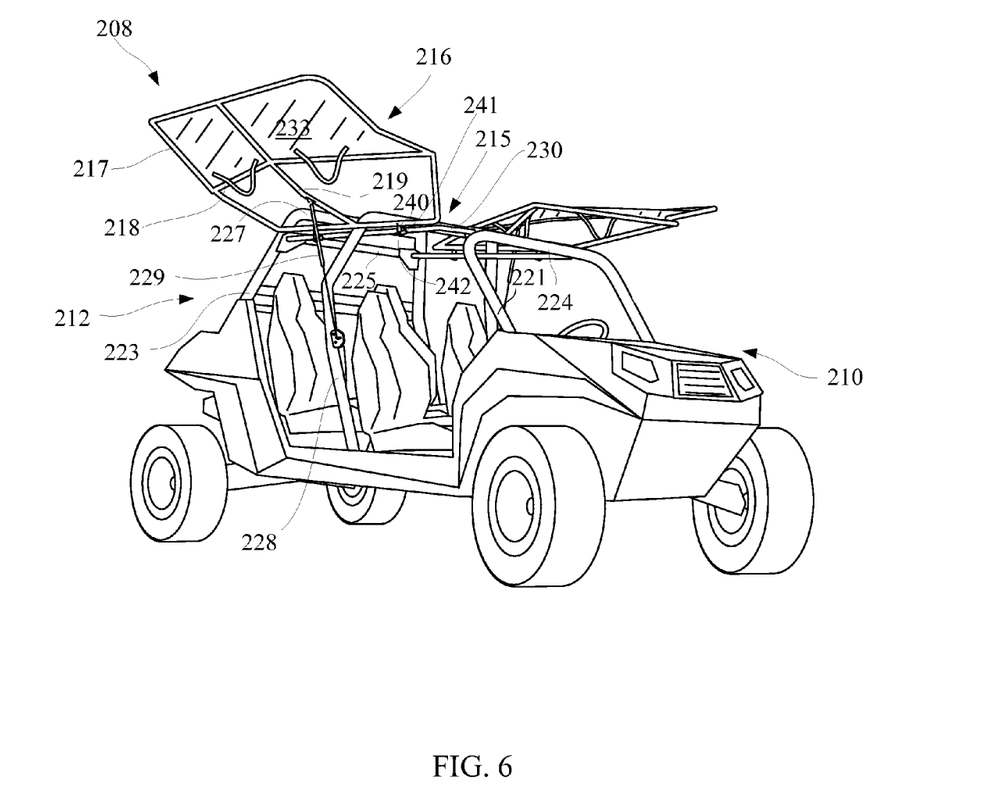
FIG. 6 shows a perspective view of a UTV with a gull wing door assembly according to principles of the present invention, with the doors in the open position.

In another exemplary embodiment of the present invention, shown in FIG. 6, a gull wing door assembly 208 may be provided on a 4-passenger UTV 210 having two rows of side-by-side seating. The principles of the present invention as applied to the UTV 210 are similar. The gull wing door assembly 208 includes a door 216 attached to a hinge assembly 215 attached to the cage 212. The door 216 includes a frame 217, and optionally may include a crossbar 218 and one or more panels 233. The door 216 may also have a middle door post 219 for adding strength and rigidity to the door frame 217. The door 216 may include a panel 233 in the lower part of the door 216, and may also have a panel (not shown) in the upper part of the door 216. The panel 233 may be as described above for the single-row UTV. The hinge assembly 215 comprises an upper door brace 230 attached to the top of the cage 212, generally to any one or more of the top right crossbar 227, front crossbar 224, and rear crossbar 225. It may be attached by any means, such as a fastener, snap-fitting, or welding, or it may be attached by the use of mounting plates and clamping plates, as described above with respect to the single-row UTV (see FIGS. 4 and 5). Holes may need to be drilled in the crossbars for the use of fasteners.

The hinge assembly 215 may be configured to have a rotational axis substantially parallel to the ground when installed on the UTV 210. The door frame 217 is configured to movably attach to the hinge assembly 215 such that the door 216 rotates about the rotational axis of the hinge assembly 215, thereby providing for a door 216 that opens upwards. Any type of hinge that accomplishes this may be employed, including the use of hinge brackets 240 and 241 and hinge pins 242 on the upper door brace 230 and on the frame 217.

In another aspect not shown in the Figures, a multiple-row UTV may have a separate gull wing door assembly for each row. For example, a UTV having two rows of side-by-side seating, for a total of four passengers, may have four gull wing doors.

The gull wing door assembly 208 may also comprise a lift-assist device, such as a gas strut 229. The gas strut 229 may be attached to the middle UTV post 228 and the middle door post 219. In another embodiment (not shown), the gas strut may be attached to any of the rear post 223 or front post 221, so long as the gas strut provides lift to the door 216 and does not interfere with the entrance and exit of passengers to and from the UTV 210.

There is thus disclosed a gull wing door assembly for UTVs. The gull wing door assembly as described herein allows easy entry and exit because the door and all framework gets out of the way when the door is opened. The gull wing doors also stay closed when latched, and stay open when opened.

The gull wing door assembly as described herein can be used on any type or model of UTV, including those not depicted in the Figures, and any other type of all-terrain and utility vehicle having a cab defined by a cage, including but not limited to dune buggies, go-carts, and JEEP® vehicles, such as the WRANGLER®. It will thus be appreciated that numerous changes may be made to the present invention without departing from the scope of the claims.

What is claimed is:

1. A gull wing door assembly for an all-terrain utility vehicle, comprising:
a hinge assembly configured to attach to an upper door brace of a cage of the all-terrain utility vehicle, wherein said upper door brace further comprises: a top mounting plate and a bottom clamping plate for securing the first end to the cage; and a rear mounting plate and a rear clamping plate for securing the second end to the cage, the hinge assembly having a rotational axis substantially parallel to the ground when attached to the cage; and a door configured to movably attach to the hinge assembly, said upper door brace comprises a first end configured to attach to one or more of a front post, front crossbar, and side crossbar; a second end configured to attach to one or more of a rear post, rear crossbar, and side crossbar.

2. The gull wing door assembly of claim 1, wherein said door comprises a frame adapted to cover the side of the cage when the door is closed.

3. The gull wing door assembly of claim 1, wherein said door further comprises a cross-member.

4. The gull wing door assembly of claim 1, wherein said door further comprises a panel.

5. The gull wing door assembly of claim 1, further comprising a lift-assist device.

6. The gull wing door assembly of claim 5, wherein said lift-assist device comprises a gas strut having a first end connected to the cage and a second end connected to the door.

7. The gull wing door assembly of claim 6, wherein the first end of the gas-strut is movably attached to a ball mount attached to the cage, and the second end of the gas-strut is movably attached to a ball mount attached to the door.

8. The gull wing door assembly of claim 1, wherein said hinge assembly further comprises one or more door hinge brackets attached to the door and one or more upper door brace hinge brackets attached to the upper door brace, wherein each door hinge bracket is configured to align with a corresponding upper door brace hinge bracket to allow a hinge pin to be inserted through each door hinge bracket and upper door brace hinge bracket combination.

* * * * *